US012111602B2

(12) United States Patent
Ohishi

(10) Patent No.: US 12,111,602 B2
(45) Date of Patent: Oct. 8, 2024

(54) IMAGE FORMING DEVICE

(71) Applicant: SHARP KABUSHIKI KAISHA, Sakai (JP)

(72) Inventor: Masatsugu Ohishi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 18/229,400

(22) Filed: Aug. 2, 2023

(65) Prior Publication Data

US 2024/0045366 A1 Feb. 8, 2024

(30) Foreign Application Priority Data

Aug. 5, 2022 (JP) ................................ 2022-125648

(51) Int. Cl.
*G03G 15/00* (2006.01)
*G03G 21/16* (2006.01)

(52) U.S. Cl.
CPC ................................ *G03G 21/1619* (2013.01)

(58) Field of Classification Search
None
See application file for complete search history.

(56) References Cited

U.S. PATENT DOCUMENTS 8,792,803 B2 7/2014 Imai
2011/0280615 A1 11/2011 Imai
2015/0234339 A1* 8/2015 Nakamura ........... H05K 7/1402 399/107
2015/0244887 A1* 8/2015 Hozono ............. G03G 21/1604 358/474
2018/0027136 A1* 1/2018 Yokota ..................... B41J 29/02 347/110

FOREIGN PATENT DOCUMENTS

JP 2011-242511 A 12/2011

* cited by examiner

*Primary Examiner* — Hoang X Ngo
(74) *Attorney, Agent, or Firm* — ScienBiziP, P.C.

(57) ABSTRACT

An image forming device is provided with a rear face including a plurality of divided exterior plates. The plurality of exterior plates includes the exterior plates adjacent to each other in the lateral direction. A joint line of the exterior plates adjacent to each other in the lateral direction has a spigot joint shape, and a protrusion that discharges water to the outside is provided at a groove having the spigot joint shape.

6 Claims, 12 Drawing Sheets

IMAGE FORMING DEVICE

TECHNICAL FIELD

The disclosure relates to an image forming device including an exterior component capable of preventing infiltration of water from the outside.

BACKGROUND ART

As a structure of a housing of a known image forming device, for example, a housing fitting structure is known that maintains the aesthetics of a device, and that prevents the device from being damaged even when an external force is applied thereto. As a structure of a joint line between exterior components, this housing fitting structure has a configuration that prevents infiltration of foreign matter through a gap. In this configuration, since an upper exterior plate is overlaid on the outer side of a lower exterior plate, even when a spigot joint shape is used, this configuration is highly resistant to the infiltration of water.

Meanwhile, in general, it is desirable that the upper exterior plate be overlaid with the lower exterior plate so that the upper exterior plate is disposed on the inner side of the lower exterior plate, for the purpose of maintenance and the like of the image forming device. Such an image forming device will be described. FIG. 13 is a perspective view illustrating a rear face 30 of such an image forming device, and the rear face 30 includes an upper left exterior plate 31, an upper right exterior plate 32 connected to the upper left exterior plate 31 on the right side in the lateral direction, and a lower exterior plate 33 provided below the upper left exterior plate 31 and the upper right exterior plate 32, each of which is a portion of a rear cabinet. In FIG. 13, a portion 35 is connected to a corner portion 34 on the left side in the lateral direction, and the corner portion 34 is formed, on the left side in the lateral direction, to be continuous with the upper left exterior plate 31 and the lower exterior plate 33 connected to the lower end of the upper left exterior plate 31 of the rear cabinet. Thus, the portion 35 is structured to be able to be opened and closed when a paper jam or the like occurs, and the portion 35 is not fixed like the above-described exterior plates 31 to 33.

FIG. 14A and FIG. 14B are enlarged perspective views of a connecting portion between the upper left exterior plate 31, the upper right exterior plate 32, and the lower exterior plate 33 illustrated in FIG. 13, and are diagrams illustrating states in which these exterior plates 31 to 33 are connected to each other in a spigot joint shape. As illustrated in FIG. 14A, a step portion 31*a* extending toward the inner side of the upper left exterior plate 31, and an angled portion 31*b* extending downward from an inner end portion of the step portion 31*a* are provided at a lower end portion of the upper left exterior plate 31, and the lower exterior plate 33 is attached to the step portion 31*a* from the outer side. Further, a protrusion 33*a* extending toward the inner side in the horizontal direction so as to receive the angled portion 31*b* is provided at an upper end portion of the lower exterior plate 33. Similarly, as illustrated in FIG. 14B, the upper right exterior plate 32 has a similar configuration, and the protrusion 33*a* extending toward the inner side in the horizontal direction so as to receive a step portion of the upper right exterior plate 32 is provided at the upper end portion of the lower exterior plate 33.

FIG. 15A is a perspective view of the rear cabinet when viewed from the inner side thereof, and is a perspective view illustrating a portion at which the three upper and lower exterior plates 31 to 33 are connected to each other. FIG. 15B is an enlarged perspective view of a portion indicated by a rectangle 15B in FIG. 15A.

As illustrated in FIG. 14A to FIG. 15B, the connecting portion between the upper left exterior plate 31, the upper right exterior plate 32, and the lower exterior plate 33 of the rear cabinet has a configuration in which the exterior plates 31, 32, 33 are overlaid with each other in the spigot joint shape so that the lower exterior plate 33 is easily detached. In other words, the connecting portion between the upper left exterior plate 31 and the upper right exterior plate 32 of the rear cabinet forms a groove extending downward from above, and a spigot joint overlaid portion between these upper exterior plates 31, 32 and the lower exterior plate 33 forms lateral grooves intersecting each other. Thus, an intersecting section of the three exterior plates forms an inverted T-shaped groove. Therefore, water flowing from above is divided in the lateral direction at an intersecting section at which three exterior plates X, Y, and Z intersect each other. Thus, the water easily infiltrates into the inside from the outside, as indicated by an arrow in FIG. 15B.

SUMMARY

Technical Problem

The rear face of the known image forming device is configured as described above. Since the intersecting portion of the exterior plates is formed in the inverted T-shape, when water flows through the grooves formed by the exterior plates, the inverted T-shaped grooves serve as water channels, and a larger amount of water flows therethrough more vigorously than when normal exterior plates are used. When the water reaches a lower portion of the inverted T-shape, the water spreads laterally. Since the force of the water is strong, the water enters the inside of a main body of the image forming device through a gap of a joint line of the exterior plates, and water droplets adhere to electrical components such as a substrate. In order to cope with this problem, for example, countermeasure sheets have been added, and a design incorporating a water channel preventing the water droplets from adhering to important components has been adopted. However, with these countermeasures, there have been problems in that costs are increased, and a degree of freedom in internal design is reduced.

The disclosure has been made to solve the above-described problems, and an object of the disclosure is to provide an image forming device capable of reducing costs and increasing a degree of freedom in internal design.

Solution to Problem

An image forming device according to the disclosure includes a fixed rear face. The rear face includes a plurality of divided exterior plates, the plurality of exterior plates includes exterior plates adjacent to each other in a lateral direction, a joint line of the exterior plates adjacent to each other in the lateral direction has a spigot joint shape, and a member that discharges water to the outside is provided at the spigot joint-shaped portion.

The member that discharges the water to the outside is preferably a protrusion.

More preferably, the protrusion is provided at a lower portion of the joint line of the exterior plates adjacent to each other in the lateral direction.

The protrusion may be provided with an inclined surface to easily guide the water to the outside, and a height of the protrusion may be lower than a height of the adjacent exterior plate.

A plurality of the protrusions may be provided at the joint line.

According to an embodiment of the disclosure, the member that discharges the water to the outside is a recess.

Advantage Effects of Disclosure

According to the disclosure, since a member that discharges water to the outside, such as a protrusion, is provided at a joint line of exterior plates adjacent to each other in the lateral direction, infiltration of water can be prevented. Thus, it becomes unnecessary to add any sheet or take any design measure for preventing infiltration of water droplets into a device main body (such as addition of a waterproof sheet or design of a water channel), and it is possible to provide an image forming device capable of achieving a cost reduction and increasing a degree of freedom in internal design.

The above-described objects, other objects, features, and advantages of the disclosure will be further obvious from the detailed description of examples given below with reference to the drawings.

DESCRIPTION OF EMBODIMENTS

First Embodiment

Figure 1:
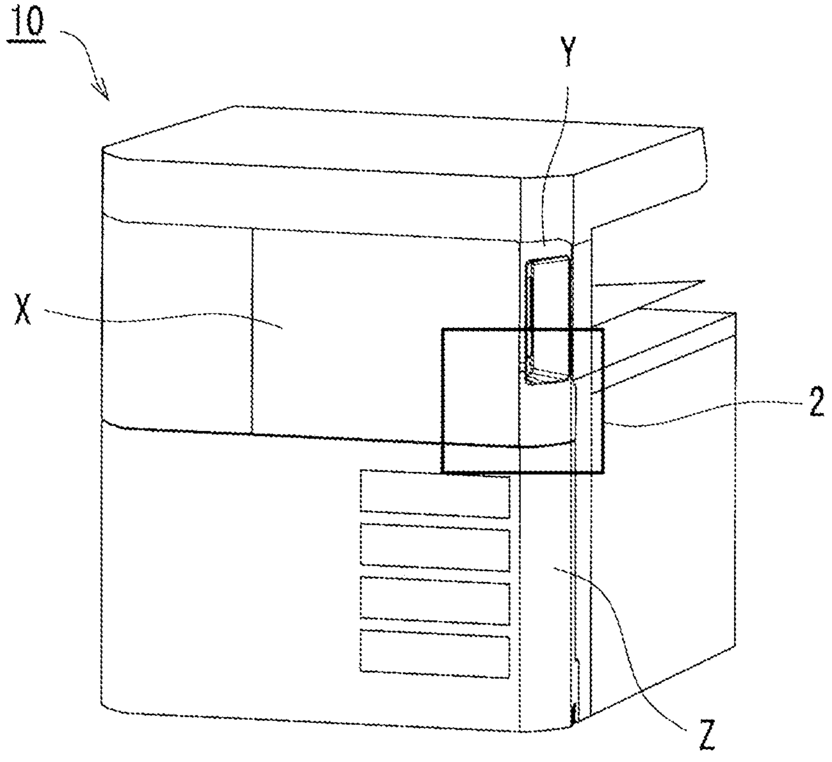
FIG. 1 is a perspective view illustrating a rear face of an image forming device according to a first embodiment of the disclosure.

An embodiment according to the disclosure will be described below with reference to the drawings. First, a state in which exterior plates are attached to an image forming device according to the embodiment of the disclosure will be described. FIG. 1 is a perspective view illustrating a rear face 10 of an image forming device according to a first embodiment of the disclosure. As illustrated in FIG. 1, the rear face 10 of the image forming device is formed by a fixed exterior component (exterior plate) divided into a plurality of components for maintainability, component influence, and the like. Here, the exterior plates of the rear face of the image forming device are referred to as a rear cabinet upper left plate (an exterior plate X, indicated by X in the drawings), a rear cabinet upper right plate (an exterior plate Y, indicated by Y in the drawings), and a rear cabinet lower plate (an exterior plate Z, indicated by Z in the drawings). Note that the exterior plate Z is provided below both the exterior plate X and the exterior plate Y.

Figure 2:
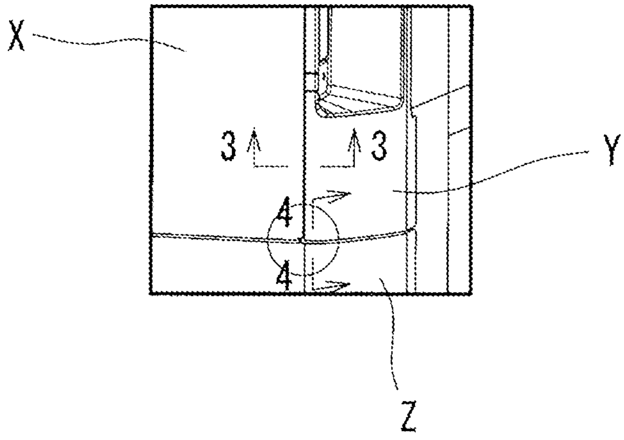
FIG. 2 is an enlarged perspective view illustrating a portion surrounded by a rectangle in FIG. 1.
Figure 3:
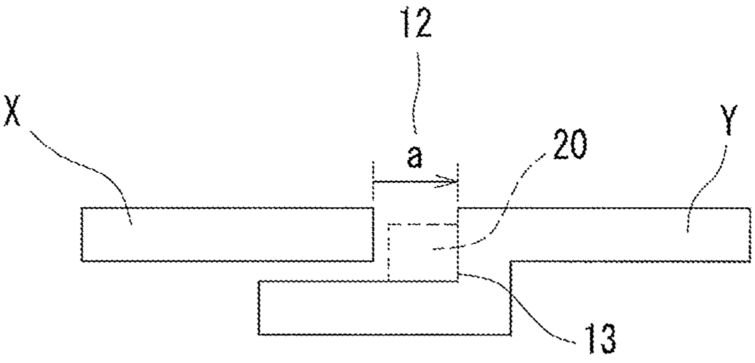
FIG. 3 is a cross-sectional view of a portion indicated by arrows 3-3 in FIG. 2.
Figure 4:
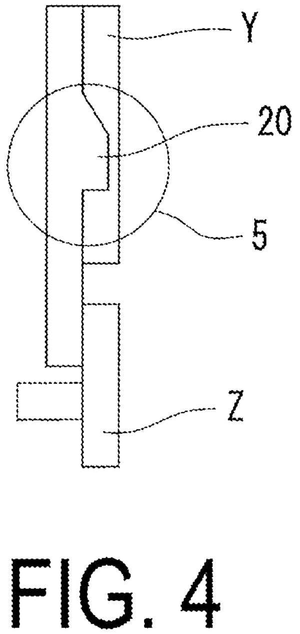
FIG. 4 is a cross-sectional view of a portion indicated by arrows 4-4 in FIG. 2.
Figure 5:
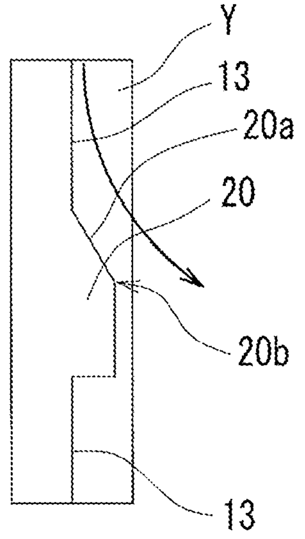
FIG. 5 is an enlarged cross-sectional view of a portion surrounded by a circle and indicated by 5 in FIG. 4.

FIG. 2 is an enlarged perspective view of a portion surrounded by a rectangle and indicated by 2 in FIG. 1, FIG. 3 is a cross-sectional view of a portion indicated by arrows 3-3 in FIG. 2 (the upper side in the drawing is the outer surface thereof), FIG. 4 is a cross-sectional view of a portion indicated by arrows 4-4 in FIG. 2 (the right side in the drawing is the outer surface thereof), and FIG. 5 is an enlarged cross-sectional view of a portion surrounded by a circle and indicated by 5 in FIG. 4.

As illustrated in FIGS. 2 to 5, the exterior plate X and the exterior plate Y adjacent to each other in the lateral direction have a spigot joint shape forming a joint line having a gap 12 indicated by an arrow a in the drawing, and a groove 13 is formed in the vertical direction of the gap (connection section) 12. Further, a cross section of a connecting portion between the exterior plate Y and the exterior plate Z in the vertical direction is configured as illustrated in FIG. 4, and a protrusion 20 is provided as a member that discharges water to the outside at a bottom portion of the groove 13. In addition, the lateral position of the protrusion 20 is indicated by a dotted line 20 in FIG. 3.

Here, as illustrated in FIG. 5, the protrusion 20 has an inclined surface **20*a* diagonally rising from the groove 13, and as illustrated by an arrow in the drawing, water is guided to the outside along the inclined surface 20*a*. Note that the height of the protrusion 20 is lower than the depth of the groove 13**.

The reason why the protrusion 20 is provided at the groove 13, as described above, is as follows. Based on a water injection test, it is known that the groove 13, which extends in the vertical direction and is formed by the gap 12 of the connecting portion formed between the exterior plate X and the exterior plate Y connected to each other in the lateral direction, becomes a water channel and water flows vigorously through the groove 13. Thus, even when the spigot joint shape is adopted as illustrated in FIG. 3, water may enter the inside of the rear face 10 of the image forming device from a point (a portion indicated by a circle in FIG. 2) at which the exterior plates X, Y, and Z illustrated in FIG. 2 are overlaid with each other.

In order to prevent the infiltration of water, in the disclosure, the protrusion 20 that guides water to the outside is provided at the groove 13 having the spigot joint shape.

As described above, when water is splashed on the image forming device from the outside and flows along the rear face of the main body, the groove 13 constituting the vertical joint line of the exterior components arranged on the left and right sides becomes a water channel, and the water flows vigorously therethrough. In the disclosure, by providing the protrusion 20 at the groove 13, the water can be guided to the outside of the machine (image forming device).

In particular, when another exterior plate is provided below the exterior components disposed on the left and right sides, and the joint line of the exterior plates forms an inverted T-shaped groove, if the water flows through the joint line and reaches a lower portion of the inverted T-shape, due to a strong force of water, the water enters the inside of the main body of the image forming device through the gap of the joint line of the exterior plates rather than spreading laterally. However, using the protrusion 20, this infiltration of water can be prevented.

Figure 6:
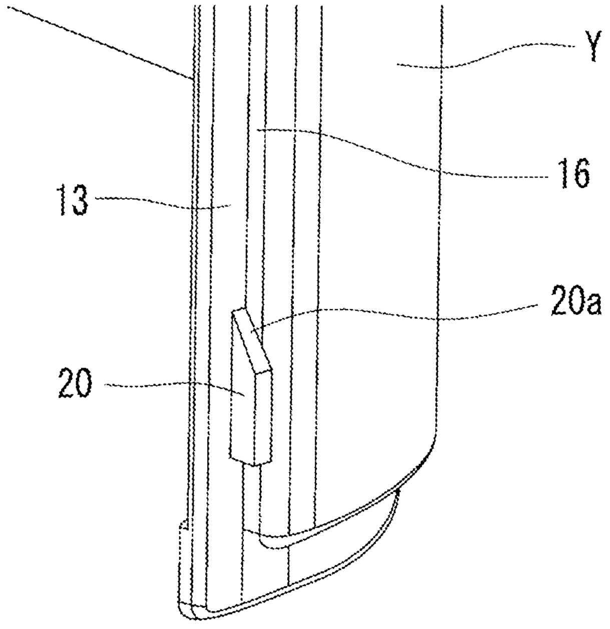
FIG. 6 is a perspective view of a protrusion illustrated in FIG. 4 when viewed from the outside of a connecting portion of an exterior plate Y.

Next, the connecting portion of the exterior plates including the protrusion 20 will be described in detail. FIG. 6 is a perspective view, when viewed from the outside, illustrating a state in which the protrusion 20 illustrated in FIG. 4 is provided at the connecting portion between the exterior plate X and the exterior plate Y (however, the exterior plate X is not illustrated), FIG. 7 is a perspective view illustrating the connecting portion between the three exterior plates X, Y, and Z when viewed from the outside, and FIG. 8 is a cross-sectional view of the connecting portion illustrated in FIG. 7, taken along a connecting portion between the protrusion 20 and the exterior plate X.

Figure 7:
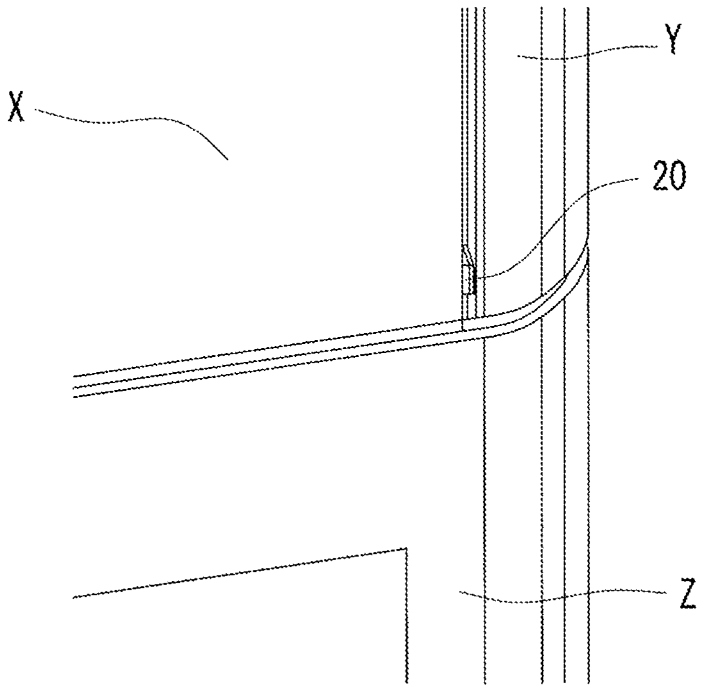
FIG. 7 is a perspective view of a connecting portion of exterior plates X, Y, and Z when viewed from the outside.
Figure 8:
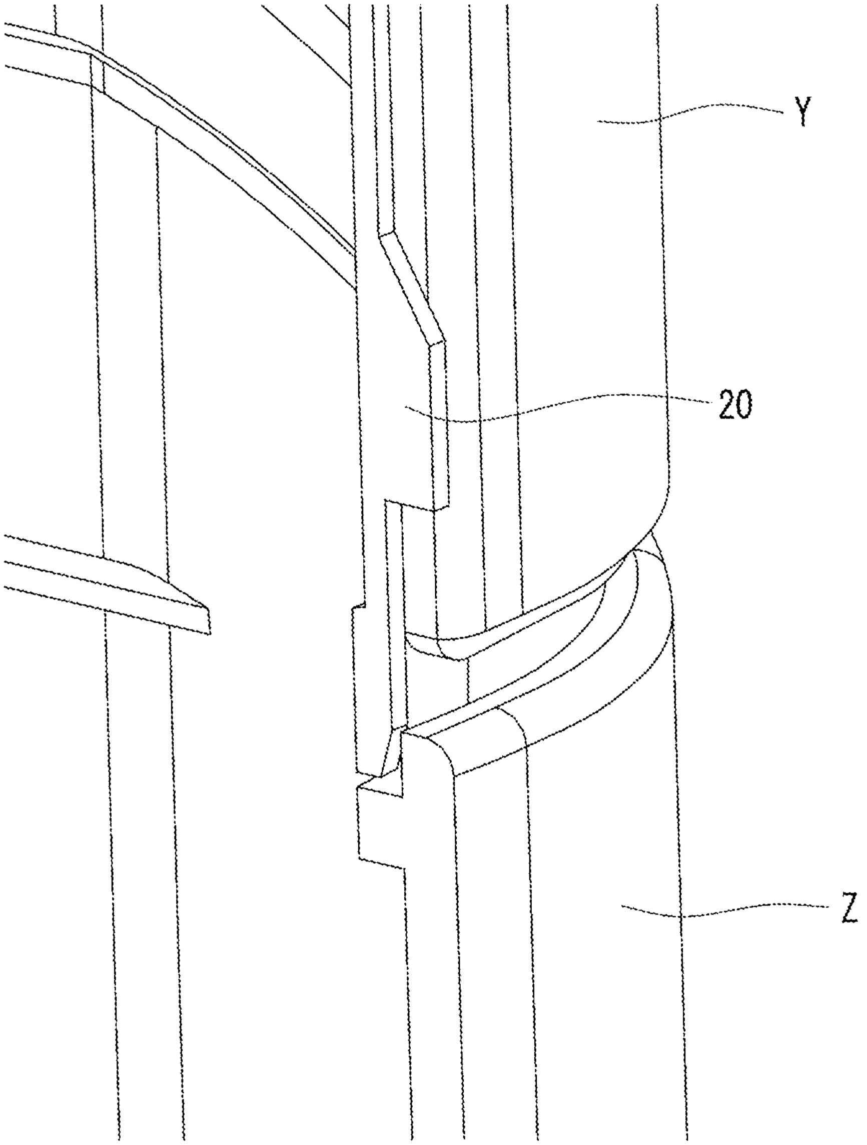
FIG. 8 is an enlarged perspective view of a protrusion provided at a connecting portion of the exterior plates Y, Z when viewed in a state in which the exterior plate X is removed.

As illustrated in FIGS. 6 to 8, the protrusion 20 having the inclined surface 20*a* is provided at a lower end portion of a joint line 16 of the exterior plate constituting the groove 13 (in this case, the exterior plate Y) among the two exterior plates X and Y connected to each other in the lateral direction. In this way, the protrusion 20 becomes inconspicuous, and does not affect the appearance of the image forming device. In addition, since there is also a flow of water laterally flowing into the water channel, effectiveness is increased when the protrusion 20 is positioned at a lower portion of the joint line 16. Further, by providing the inclined surface 20*a*, the water can be more easily caused to flow to the outside.

Further, as illustrated here, the protrusion 20 may be used for the purpose of positioning by being brought into contact with a side surface of the adjacent exterior plate (in this case, the exterior plate X).

Next, specific dimensions of the protrusion 20 will be described. Normally, the gap 12 has a width dimension a of 1 mm to 5 mm, and the protrusion also has a width dimension of 1 mm to 5 mm in accordance with the width dimension of the gap 12. However, when the width of the groove is increased, the effect of the protrusion 20 discharging the water to the outside is reduced. Therefore, the width is preferably approximately 2 mm.

Note that the inclination of the inclined surface 20*a* is preferably steep. For example, the inclination angle with respect to the horizontal direction is preferably 30 degrees or greater. In addition, an edge portion (indicated by 20*b* in FIG. 5) at which the inclined surface 20*a* and a flat portion of an upper portion of the protrusion 20 intersect each other is linear, or has a small R (0.5 mm or less), so that when water flows down from above, the flow of the water can be drained. This is to prevent water droplets from traveling downward.

Figure 9:
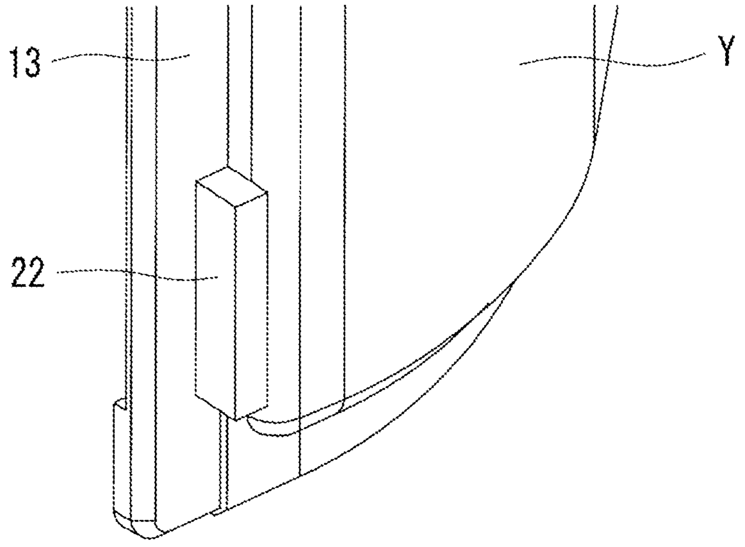
FIG. 9 is a perspective view illustrating another shape of the protrusion.

Next, another shape of the protrusion according to the disclosure will be described. FIG. 9 is a perspective view illustrating the other shape of the protrusion. As illustrated in FIG. 9, in this embodiment, a protrusion 22 has a rectangular parallelepiped shape, and does not have an inclined portion inclined outward from above in the downward direction. Since the water flows in the groove 13 of a spigot joint portion, even when the rectangular parallelepiped shape illustrated in FIG. 9 is adopted, a certain degree of effect can be expected for the purpose of discharging the water to the outside of the machine (image forming device). However, there is a possibility that the water remains on the flat surface of the protrusion, or on a rising portion of the protrusion. Thus, in order to improve the effect, the inclined surface 20*a* is preferably formed as illustrated in FIG. 6.

Figure 10:
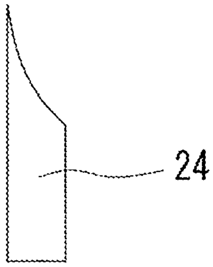
FIG. 10 is a perspective view illustrating yet another shape of the protrusion.

Next, yet another shape of the protrusion will be described. FIG. 10 is a perspective view illustrating the yet another shape of the protrusion. As illustrated in FIG. 10, a protrusion 24 has an inclined surface formed in an arc shape and inclined from above in the downward direction. Even when the protrusion 24 has such a shape, the same effect as that of the embodiment described above can be obtained.

Next, the number of protrusions will be described. In the above-described embodiment, a case is described in which the single protrusion is provided at a lower end portion of an inwardly extending portion of the exterior plates X and Y adjacent to each other in the lateral direction, the inwardly extending portion forming the spigot joint portion. However, the number of protrusions is not limited to this example, and a plurality of the protrusions may be provided.

Figure 11:
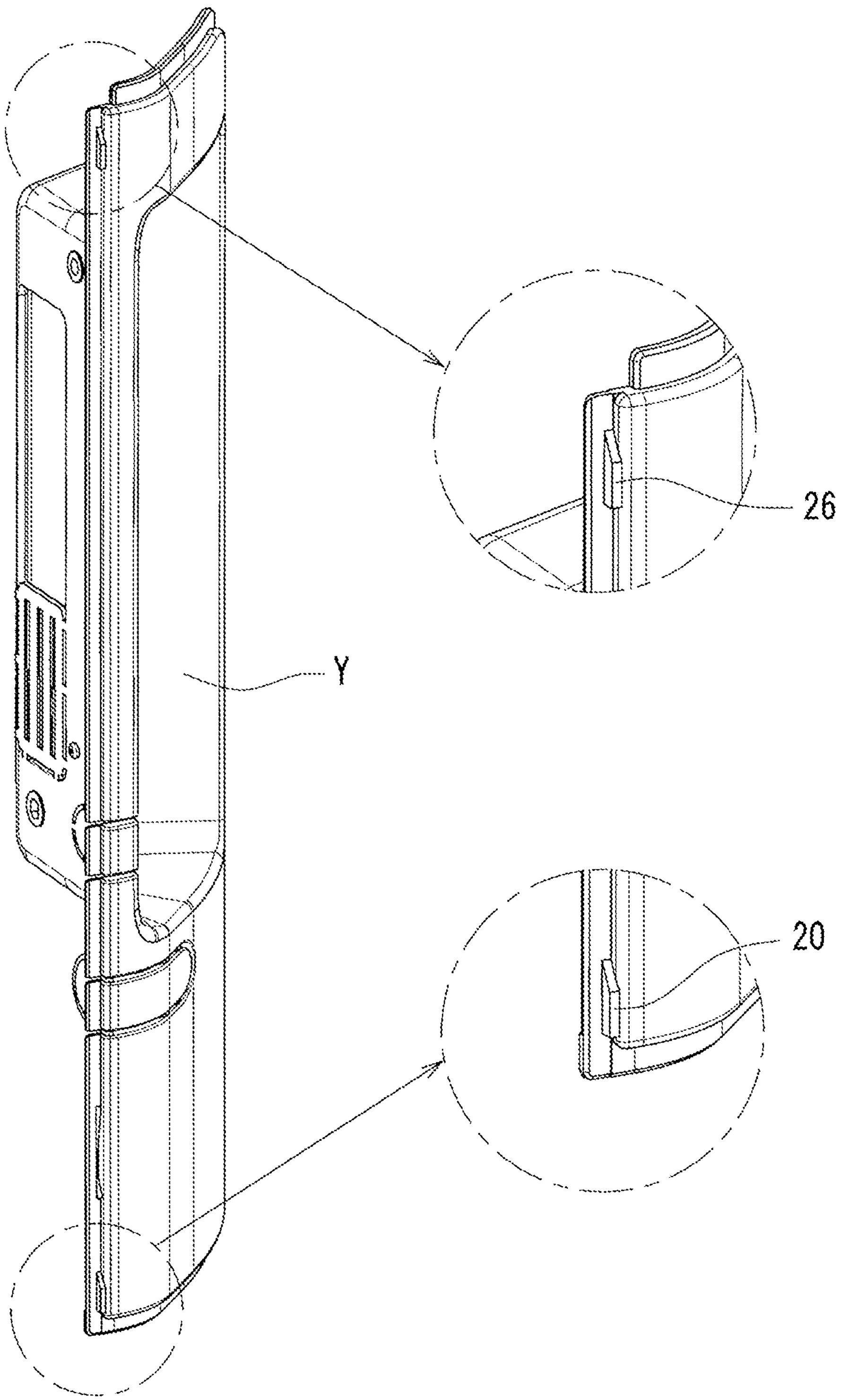
FIG. 11 is a perspective view illustrating a state in which a plurality of the protrusions are provided.

FIG. 11 is a diagram for describing the protrusions in this case. As illustrated in FIG. 11, here, the protrusion 20 illustrated in FIG. 6 is provided at a lower portion of the exterior plate Y, and a similar protrusion 26 is further provided at an upper portion of the exterior plate Y. In this way, when a plurality of the protrusions 20, 26 are disposed at the upper and lower portions as described above, an amount of water infiltrating into the machine (image forming device) is further reduced by discharging the water to the outside at a plurality of locations.

Further, by forming the protrusions having the same shape in the vertical direction, the protrusions can be used for positioning the adjacent exterior plates (the exterior plate X and the exterior plate Y in FIG. 7, for example). In other words, the gap between the adjacent exterior plates can be maintained at a constant value.

Further, as illustrated in FIG. 8, the lower end portion of the protrusion 20 is preferably provided so as to be in close proximity to the exterior plate Z.

Second Embodiment

Figure 12:
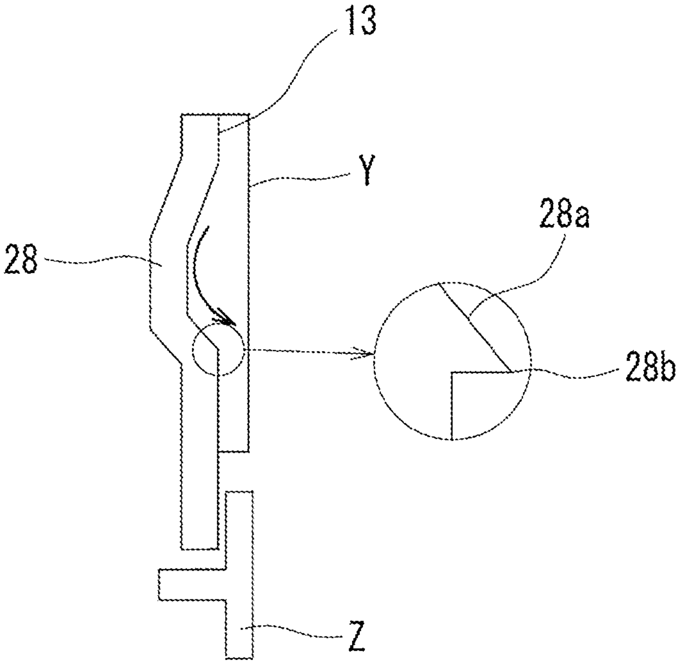
FIG. 12 is a perspective view illustrating a state in which a recess is provided as a member that discharges water to the outside.
Figure 13:
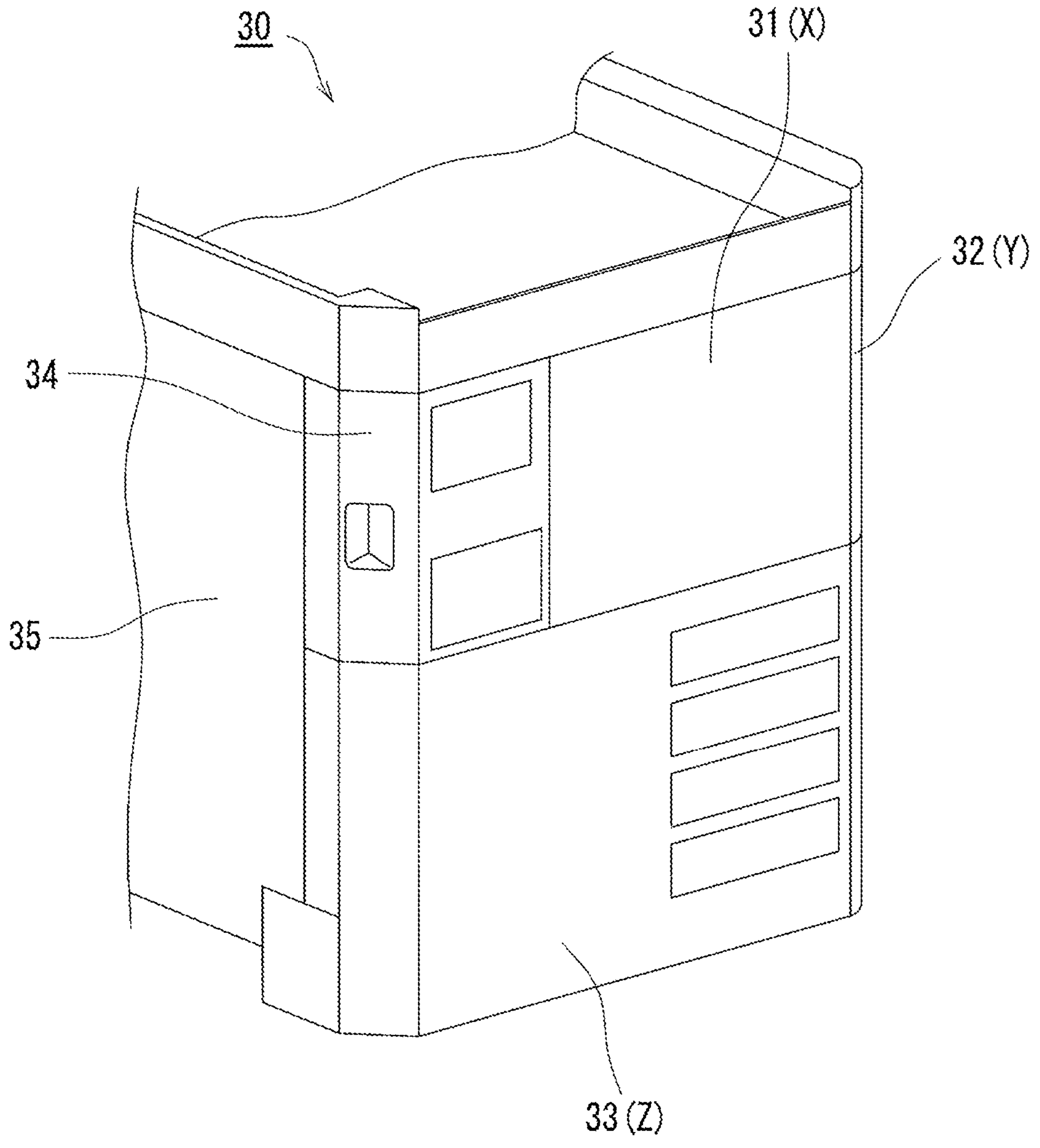
FIG. 13 is a perspective view illustrating a known rear face of an image forming device.
Figure 14A:
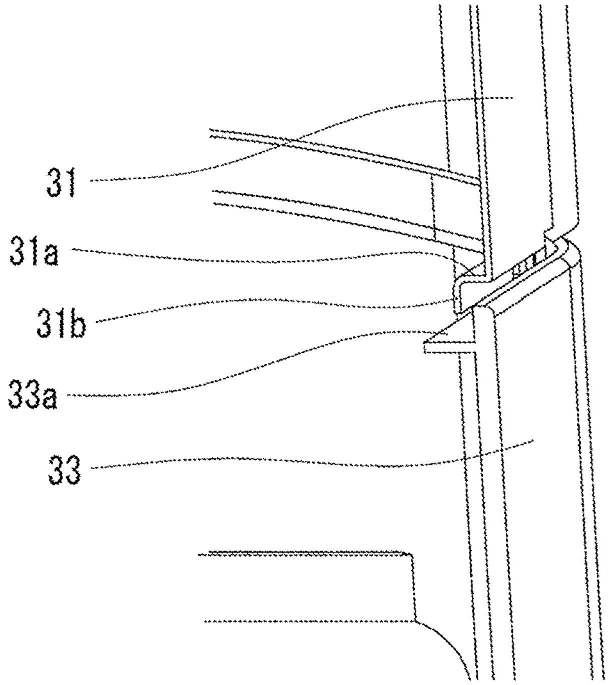
FIG. 14A is an enlarged perspective view of a portion indicated by the exterior plates X, Z in FIG. 13.
Figure 14B:
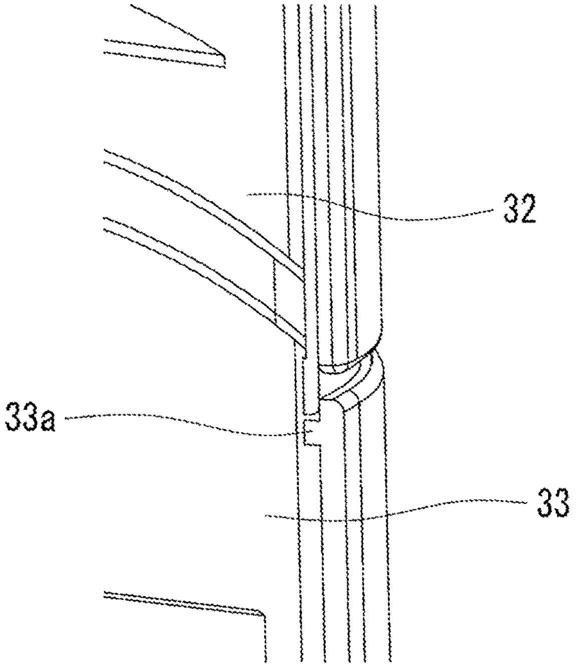
FIG. 14B is an enlarged perspective view of a portion indicated by the exterior plates Y, Z in FIG. 13.
Figure 15A:
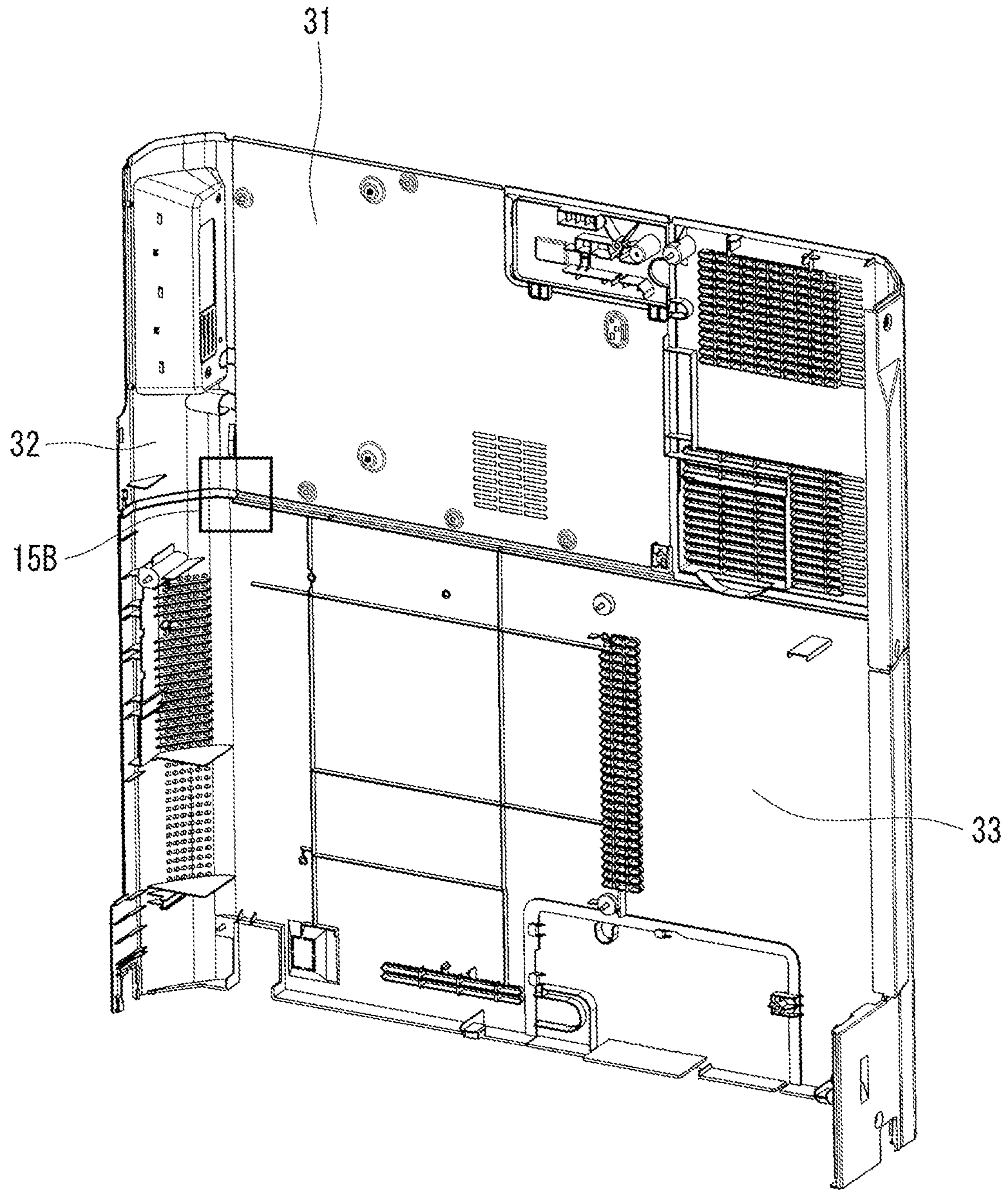
FIG. 15A is a perspective view illustrating a rear cabinet when viewed from the inside.
Figure 15B:
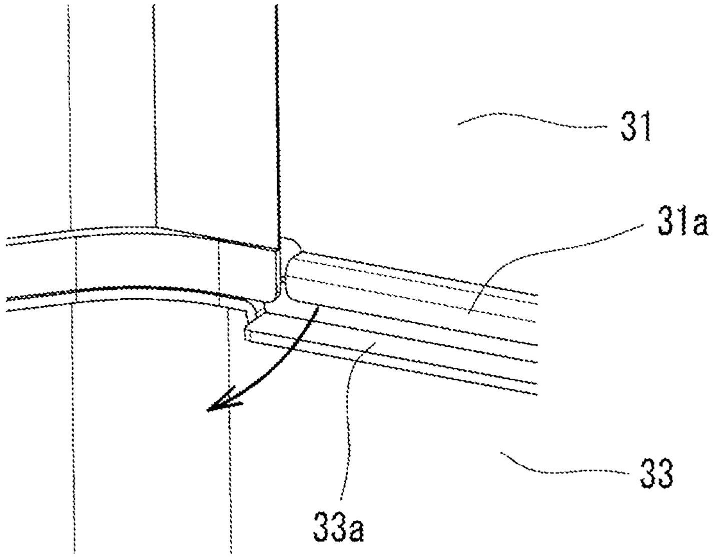
FIG. 15B is an enlarged perspective view of a portion surrounded by a rectangle in FIG. 15A.

Next, a second embodiment of the member that discharges the water to the outside will be described. In the embodiment described above, a case is described in which the protrusion is used as the member that discharges the water to the outside, but in this embodiment, a recess is provided as the member that discharges the water to the outside. FIG. 12 is a diagram for describing a case in which the recess, as the member that discharges the water to the outside, is provided instead of the protrusion 20 in FIG. 6, and is a diagram illustrating a lower end portion of the recess.

As illustrated in FIG. 12, in this embodiment, a recess 28 is formed in advance at a portion to be the groove 13 constituting the spigot joint shape. In this case, the recess 28 has the same predetermined thickness as that of the groove 13, and is recessed from the surface of the adjacent exterior plate Y. The flow of water in this case is indicated by an arrow in FIG. 12. As indicated by the arrow, the water flows from above along the surface of the recess 28, is caused to flow toward the back, and is then directed to the outside.

Since the member that discharges the water to the outside is the recess 28, the water can be discharged to the outside without generating a sense of something being out of place in terms of the appearance of the product.

Note that, here, as illustrated in an enlarged view indicated by a right arrow in FIG. 12, the tip of an end portion 28*b* of the recess 28 preferably protrudes to the outside, the recess 28 having an inclined portion 28*a* inclined toward the outside. With this protrusion, water that has been directed toward the outside but has not been discharged to the outside is prevented from once again traveling downward along the groove 13.

The disclosure may be embodied in other various forms without departing from the spirit or essential characteristics thereof. Thus, the above embodiments are merely examples and should not be interpreted as limiting. All modifications and changes equivalent in scope with the claims of the disclosure are included in the scope of the disclosure.

INDUSTRIAL APPLICABILITY

According to the disclosure, a useful image forming device is provided, since infiltration of water can be prevented by the shape of an exterior plate, making it possible to provide an image forming device capable of achieving a cost reduction and increasing a degree of freedom in internal design.

REFERENCE SIGNS LIST

10, 30 Rear face
12 Gap
13 Groove
16 Joint line
20, 22, 24, 26 Protrusion
28 Recess

The invention claimed is:

1. An image forming device comprising
a fixed rear face,
wherein the rear face includes a plurality of divided exterior plates,
the plurality of exterior plates includes exterior plates adjacent to each other in a lateral direction,
a joint line of the exterior plates adjacent to each other in the lateral direction has a spigot joint shape, and
a member that discharges water to the outside is provided at the joint line of the exterior plates.

2. The image forming device according to claim 1,
wherein the member that discharges the water to the outside is a protrusion protruding from the exterior plate.

3. The image forming device according to claim 2,
wherein the protrusion is provided at a lower portion of the joint line of the exterior plates adjacent to each other in the lateral direction.

4. The image forming device according to claim 2,
wherein the protrusion is provided with an inclined surface to easily guide the water to the outside, and
a height of the protrusion is lower than a height of the adjacent exterior plate.

5. The image forming device according to claim 2,
wherein a plurality of the protrusions are provided at the joint line.

6. The image forming device according to claim 1,
wherein the member that discharges the water to the outside is a recess.

* * * * *